United States Patent [19]

Lettau

[11] 4,107,849

[45] Aug. 22, 1978

[54] TAPERED BLOCK THICKNESS GAUGE

[75] Inventor: W. Fred Lettau, Winchester, Va.

[73] Assignee: Abex Corporation, New York, N.Y.

[21] Appl. No.: 805,256

[22] Filed: Jun. 10, 1977

[51] Int. Cl.$^2$ .............................................. G01B 5/24
[52] U.S. Cl. ................................ 33/174 E; 33/172 B; 33/180 AT
[58] Field of Search ............. 33/174 E, 172 B, 174 P, 33/172 R, 180 AT, 181 AT

[56] References Cited

U.S. PATENT DOCUMENTS

| | | | |
|---|---|---|---|
| 2,803,885 | 8/1957 | Ruggles | 33/174 P |
| 3,221,413 | 12/1965 | Fesser | 33/174 P |
| 3,685,160 | 8/1972 | MacKeigan | 33/172 R |

Primary Examiner—Richard E. Aegerter
Assistant Examiner—Willis Little
Attorney, Agent, or Firm—David A. Greenlee; Thomas S. Baker, Jr.

[57] ABSTRACT

A gauge for measuring the rate of taper and the radius of the inside surface of a tapered, arcuate brake block has a base plate which pivotally mounts a swing arm with an indicator for visually reading the variation of the radius of the internal surface from a specified radius. The gauge also has a pair of rest bars mounted on the base plate to support the brake block at the specified radius at first and second measuring points. The indicator is swept over the brake block to detect variations of the inside brake block surface from the specified radius.

5 Claims, 4 Drawing Figures

TAPERED BLOCK THICKNESS GAUGE

BACKGROUND OF THE INVENTION

1. Field of the Invention

This invention relates to a device for measuring critical dimensions of an object and, more particularly, for measuring thickness at a particular point, rate of taper and accuracy of the radius of the internal surface of a tapered, arcuate brake block. The brake block which is comprised of a friction material is fastened on its inside radial surface to a metal shoe and the assembled brake shoe is substantially installed in a drum brake mechanism in a well-known manner.

2. Summary of the Invention

One way to measure the distance between two surfaces or thickness of an object is to precisely locate one surface with respect to a fixed point and have a means for measuring the distance between the fixed point and the other surface. The thickness measurement is more complex when the solid object is tapered. This is because a first thickness measurement must occur at a given location on the object to establish a basic thickness, and a second measurement must take place at a second location a specified distance from the first location in order to obtain sufficient information to determine the rate of taper between the first and second locations. An example of a tapered object which is also curved is a brake block. The block has inside and outside surfaces formed on different radii. Since the internal surface of the brake block must be assembled on a shoe of matching radius, the accuracy of the internal surface radius must be measured as well as the thickness and rate of taper. Consequently, the subject device must accurately measure the thickness of a brake block at two points to determine rate of taper, and must also measure the variation of the internal surface radius from that specified for a matching shoe to which the block would be assembled.

The tapered block thickness gauge of the instant invention has a base plate which pivotally mounts a swing arm which has an indicator for visually indicating the variation of the radius of the internal surface of the brake block from the specified radius. A set pin is mounted on the base plate in order to zero the indicator at the specified radius. A pair of rest bars are mounted on the base plate and support the brake block at first and second measuring points. The rest bars are located from the axis of the swing arm a distance equal to the specified radius plus the specified thickness of the brake block at the respective measuring points. An end stop is attached to the base plate to retain the brake block in the proper position on the rest bars. The indicator is pivoted over the brake block to a first measuring point to check the brake block thickness with respect to that specified for that point. The indicator is then moved to the second measuring point to check the brake block thickness with respect to that specified for that point. As the indicator moves from the first measuring point to the second measuring point, the accuracy of the internal surface radius is indicated.

The subject gauge can be adapted to measure the accuracy of different brake blocks.

DESCRIPTION OF THE PREFERRED EMBODIMENT

Figure 1:
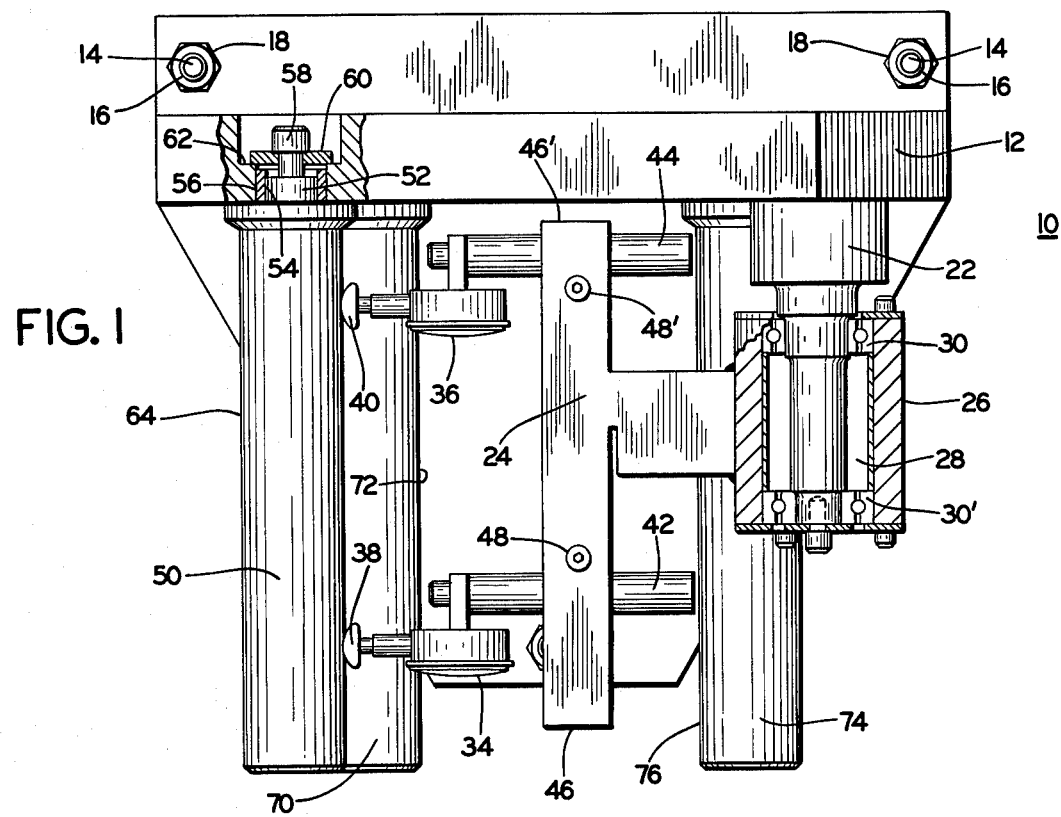
FIG. 1 is a plan view of the tapered block thickness gauge of the instant invention with the dial indicators on the set pin.

Referring to FIGS. 1–4, the tapered block thickness gauge 10 of the instant invention has an L-shaped base plate 12. Three bolts 14 are secured in bores 16 in the horizontal portion of the plate 12 by nuts 18. The base plate 12 rests on heads 20 of the bolts 14.

A pin 22 projects from the vertical portion of the base plate 12 and mounts a swing arm 24. The swing arm 24 has a cylindrical projection 26 with an internal bore 28 at one end thereof. A pair of roller bearings 30, 30' are mounted on the outside surface of the pin 22. The cylindrical portion 26 of the arm 24 is pressed over the bearings 30, 30' such that the arm 24 is pivotally mounted on the pin 22. A pair of dial indicators 34, 36 with stems 38, 40 are attached to shafts 42, 44, respectively, which are clamped at opposite sides of the swing arm 24 by clamps 46, 46'. The clamps 46, 46' have adjustment screws 48, 48' which tighten or loosen the clamps to permit axial movement of the shafts 42, 44 to adjust the respective dial indicators 34, 36.

A set pin 50 which is used to zero dial indicators 34, 36, is attached to the vertical wall of the base plate 12. The set pin 50 has a reduced diameter portion 52 at one end which is received in a bushing 54 mounted in a stepped bore 56 in the base plate 12. The set pin 50 is retained in the bushing 54 by a bolt 58 which simultaneously engages a threaded bore, not shown, in the set pin 50 and a washer 60 seated on a shoulder 62 in the bore 56. The set pin 50 could, of course, be retained on the base plate 12 by a variety of devices. It is only necessary that the outside surface 64 of the set pin 50 be accurately located with respect to the axis of the swing arm 24.

As mentioned above, a tapered, arcuate brake block 66 has its inside surface 68 fastened to a matching metal shoe surface having a specified radius to form a brake shoe, not shown. Consequently, the radius of the inside surface 68 must be as close as possible to the specified radius. In order for the gauge 10 to measure the radius of the surface 68, as described below, the set pin 50 is positioned on the plate 12 such that the distance between the outside surface 64 of the pin 50 and the axis of the swing arm 24 is the same as the specified radius of a matching shoe surface. Thus, the set pin 50 is used to zero the dial indicators 34, 36 at the specified radius.

A first rest bar 70 is mounted on the base plate 12 in the same manner as the set pin 50. Since the mounting of the set pin 50 to the base plate 12 was set forth in explicit detail, it is not believed necessary to repeat this mounting detail with respect to the rest bars or the support bar. The rest bar 70 is mounted at the first brake block measuring point. This is the first of two measuring points which are used to determine the accuracy of the rate of taper of the brake block 66. The first rest bar 70 is mounted on the base plate 12 such that the outside surface 72 of the rest bar is located from the axis of the swing arm 24 a distance equal to the specified radius of a matching shoe surface plus the specified thickness of the block 66 at the first measuring point. Therefore, at the first point the dial indicators 34, 36, which have been zeroed on the set pin 50, will read any deviation of the thickness of the block 64 from the specified thickness.

A second rest bar 74 is likewise mounted on the base plate 12. The second rest bar 74 is mounted at the second specified measuring point of the brake block 66. The rest bar 74 is mounted such that its outside surface 76 is located from the axis of the swing arm 24 a distance equal to the specified radius plus the specified thickness of the brake block 66 at the second measuring point. Therefore, at the second point the dial indicators 34, 36, which have been zeroed on the set pin 50, will read any deviation of the thickness of the block 66 from the second specified thickness.

An end stop 78 is mounted on the base plate 12 in a manner similar to the rest bars 70, 74. The end stop 78 is located so that one end 80 of the brake block 66 contacts its outside surface 82 so that the first and second measuring points on the brake block 66 correspond with the positions of the first and second rest bars 70, 74.

The operation of the tapered block thickness gauge 10 to measure thickness and accuracy of the radius of a surface of a brake block is as follows.

Figure 2:
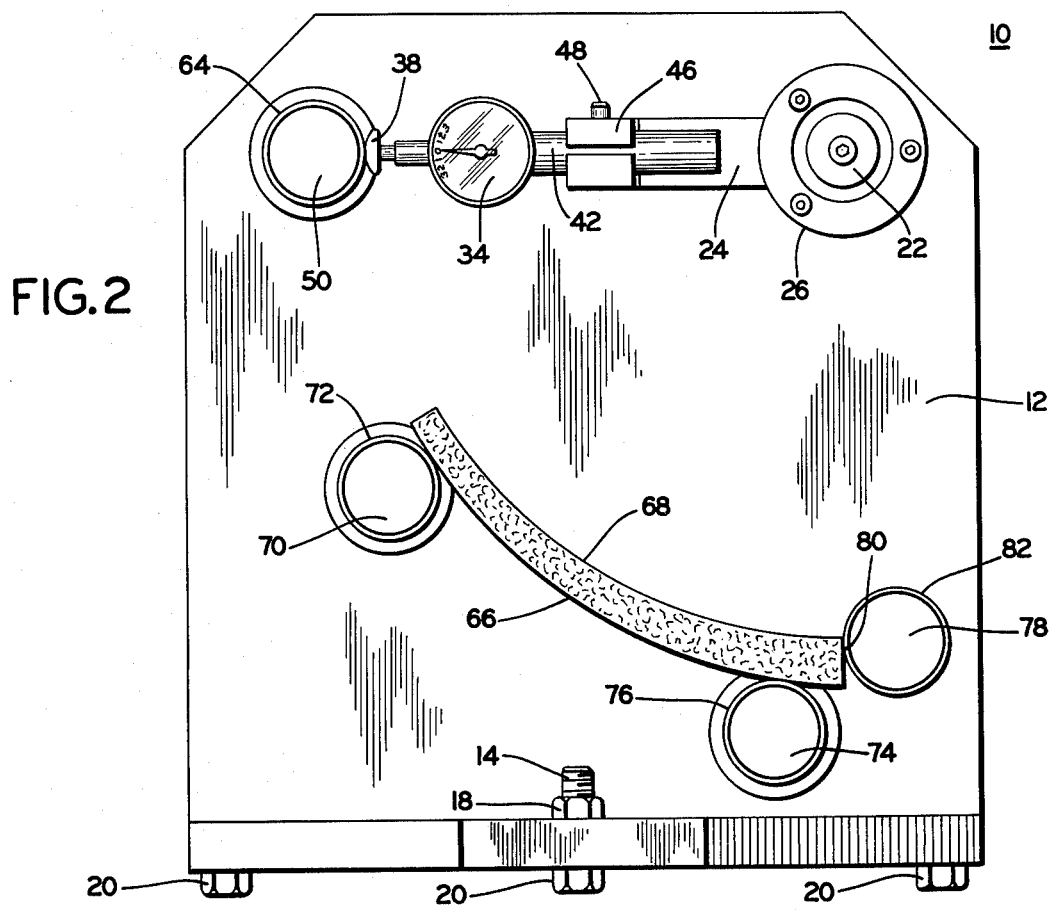
FIG. 2 is a front view of the subject gauge with the dial indicators in the same position as in FIG. 1.
Figure 3:
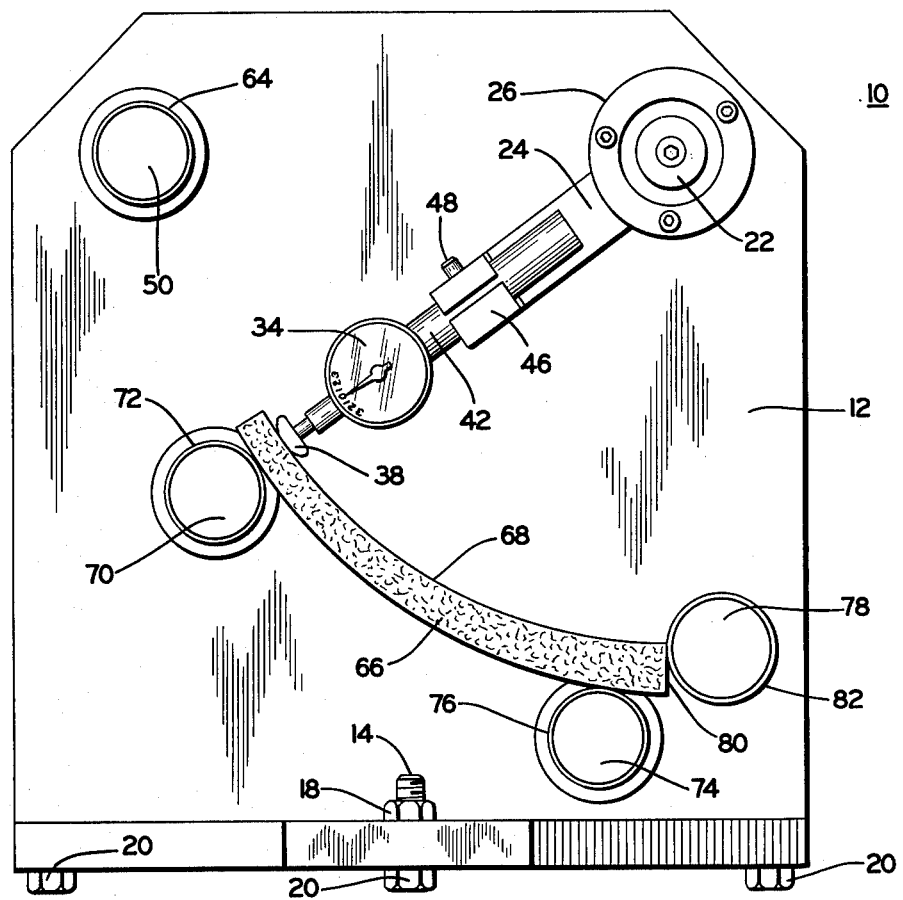
FIG. 3 is a front view of the subject gauge with the swing arm positioned such that the dial indicators engage the brake block at the first measuring point.
Figure 4:
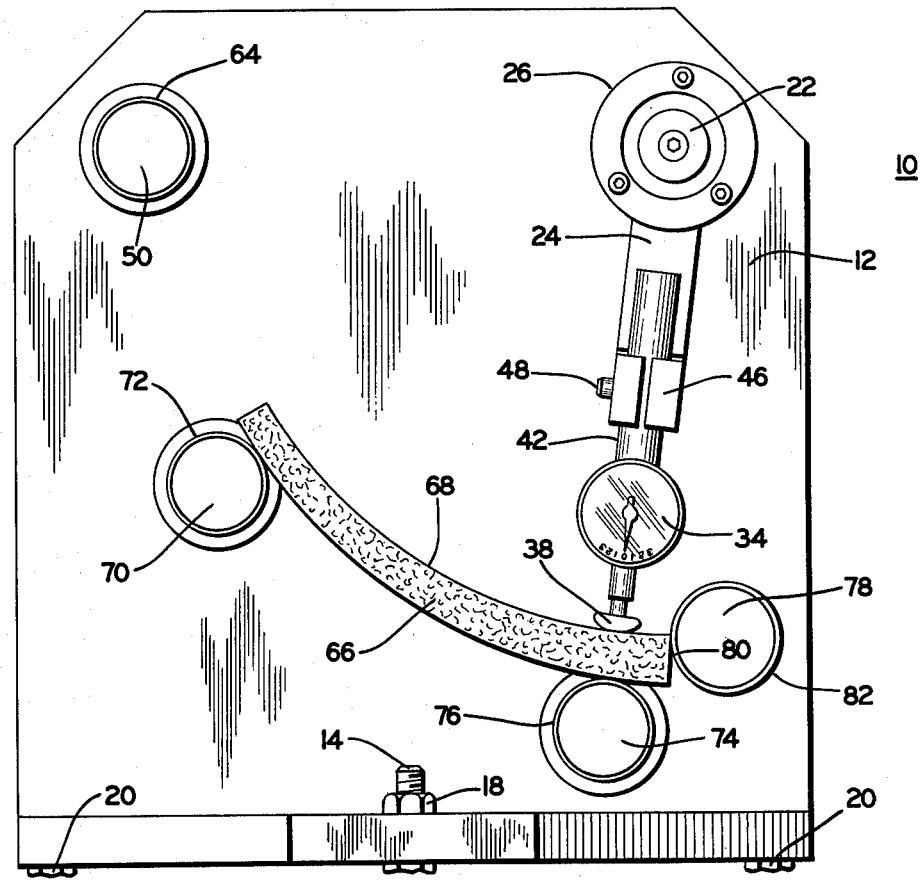
FIG. 4 is a front view of the subject gauge with the swing arm positioned such that the dial indicators engage the brake block at the second measuring point.

Referring to FIGS. 1 and 2, the swing arm 24 is initially pivoted to a horizontal position so that stems 38, 40 of the dial indicators 34, 36, respectively, rest against the outside surface 64 of the set pin 50 which is located at the specified radius. The adjustment screws 48, 48' for the clamps 46, 46' are loosened and the shafts 42, 44, holding the dial indicators 34, 36, are moved in the clamps until the indicators 34, 36 are set at zero. The adjustment screws 48, 48' are subsequently tightened to secure the setting of the dial indicators 34, 36.

The swing arm 24 is next pivoted so that the indicator stems 34, 40 rest on the inside surface 68 of the brake block 66 opposite the first rest bar 70. This is the first measuring point. Since the dial indicators 34, 36 were zeroed on the set pin 50 at the specified radius and since the outside surface 72 of the rest bar 70 is located from the axis of the swing arm 24 a distance equal to the specified radius plus the specified thickness of the brake block 66 at the first measuring point, the dial indicators 34, 36 will read zero if the brake block 66 is the specified thickness at the first measuring point. If the thickness deviation at the first measuring point is within tolerance at the first measuring point, additional measurements are taken. If it is not within the desired tolerance the brake block 66 is rejected and no further measurements are made.

If additional measurements are necessary, the swing arm 24 is next pivoted and the dial indicator stems 38, 40 sweep the inner surface 68 of the brake block 66 until the stems 38, 40 are positioned on the surface 68 opposite the second rest bar 74 which is the second measuring point. As the indicator stems 38, 40 sweep the brake block surface 68 from the first to the second measuring point, any deviation of the surface 68 from the specified radius is noted on the dial indicators 34, 36. If the radius of the inner surface 68 is out of tolerance at any point, the brake block 66 is rejected.

When the stems 38, 40 are at the second measuring point, the readings of the dial indicators are noted. Since the second rest bar 74 is located from the axis of the swing arm 24 a distance equal to the specified radius plus the desired thickness of the brake block at the second measuring point, the dial indicators 34, 36 will read zero at the second point if the brake block 66 has the proper thickness at that point. If the brake block thickness is within an acceptable tolerance at the second measuring point, the brake block 66 is accepted.

It should be noted that in the embodiment illustrated in FIGS. 1-4 a pair of dial indicators 34, 36 are mounted on the swing arm 24. One dial indicator would be sufficient to determine the accuracy of the internal surface radius and the thickness at the two measuring points. However, two dial indicators are used to check parallelism and to detect any twist that may have occurred in the block 66.

The tapered block thickness gauge 10 disclosed in the instant invention can be used to check the rate of taper and the internal surface radius of different sizes of brake blocks. In order to use the gauge 10 for other blocks, the set pin 50 and rest bars 70, 74 are exchanged for corresponding parts having surfaces at a specified radius or at a specified radius and thickness at the first or second measuring points. If the first and second measuring points are different, the rest bar locating surfaces will have to be moved and the end stop 78 will have to be changed.

Obviously, those skilled in the art may make various changes in the details and arrangements of parts without departing from the spirit and scope of the invention as it is defined in the claims hereto appended. Applicant, therefore, wishes not to be restricted to the precise construction herein disclosed.

Having thus described and shown one embodiment of the invention, what is desired to secure by Letters Patent is:

1. A gauging device for measuring the accuracy of the rate of taper of a tapered, arcuate brake block at a first measuring point and a second measuring point comprising:
   a base plate;
   a swing arm;
   means for pivotally mounting the swing arm on the base plate;
   an indicator means rigidly affixed to the swing arm for visually indicating the variation of the thickness of a brake block from a specified thickness;
   a first rest bar mounted on the base plate and projecting perpendicular from it to provide a support surface for the brake block at the first measuring point, the first said support surface located from the axis of the swing arm mounting means a distance equal to the specified radius plus the specified thickness of the brake block at the first measuring point;
   a second rest bar mounted on the base plate and projecting perpendicular from it to provide a second support surface for the brake block at the second measuring point, the second support surface located from the axis of the swing arm mounting means a distance equal to the specified radius plus the specified thickness of the brake block at the second measuring point and;
   means for positioning the brake block so that the first measuring point on the brake block is aligned with the first support surface and the second measuring point on the block is aligned with the second support surface.

2. The measuring device set forth in claim 1, including means for zeroing the indicator means at a specified radius.

3. The measuring device set forth in claim 1, wherein said positioning means includes an end stop and said end stop is mounted on said base plate.

4. The measuring device set forth in claim 1, wherein said first and said second rest bars are removable from said base plate and different sized rest bars can be substituted therefor at the first and second measuring points.

5. The measuring device set forth in claim 1, wherein said indicator means includes a pair of dial indicators to measure parallelism of the brake block.

* * * * *